United States Patent
Huang et al.

(10) Patent No.: US 12,418,334 B2
(45) Date of Patent: Sep. 16, 2025

(54) CODEBOOK FEEDBACK METHOD, NETWORK DEVICE, TERMINAL DEVICE, AND COMPUTER STORAGE MEDIUM

(71) Applicant: GUANGDONG OPPO MOBILE TELECOMMUNICATIONS CORP., LTD., Dongguan (CN)

(72) Inventors: Yingpei Huang, Dongguan (CN); Wenhong Chen, Dongguan (CN); Yun Fang, Dongguan (CN); Zhihua Shi, Dongguan (CN)

(73) Assignee: GUANGDONG OPPO MOBILE TELECOMMUNICATIONS CORP., LTD, Dongguan (CN)

(*) Notice: Subject to any disclaimer, the term of this patent is extended or adjusted under 35 U.S.C. 154(b) by 469 days.

(21) Appl. No.: 17/941,209

(22) Filed: Sep. 9, 2022

(65) Prior Publication Data
US 2023/0020700 A1    Jan. 19, 2023

Related U.S. Application Data

(63) Continuation of application No. PCT/CN2021/075356, filed on Feb. 4, 2021.

(30) Foreign Application Priority Data

Mar. 10, 2020  (WO) ............... PCT/CN2020/078641

(51) Int. Cl.
*H04B 7/06*  (2006.01)
*H04B 7/0456*  (2017.01)
(Continued)

(52) U.S. Cl.
CPC ......... *H04B 7/0634* (2013.01); *H04B 7/0456* (2013.01); *H04W 72/0453* (2013.01);
(Continued)

(58) Field of Classification Search
CPC .. H04B 7/0634; H04B 7/0456; H04B 7/0478; H04B 7/0639; H04W 72/0453;
(Continued)

(56) References Cited

U.S. PATENT DOCUMENTS

2018/0077284 A1   3/2018 Nam et al.
2020/0028555 A1   1/2020 Rahman et al.
(Continued)

FOREIGN PATENT DOCUMENTS

CN    102904694 A    1/2013
CN    104144007 A    11/2014
(Continued)

OTHER PUBLICATIONS

The supplementary European search report dated Aug. 16, 2023 from European patent Application No. 21767564.4.
(Continued)

*Primary Examiner* — Charles C Jiang
*Assistant Examiner* — Rachel Elizabeth Marks
(74) *Attorney, Agent, or Firm* — BAYES PLLC

(57) ABSTRACT

A codebook feedback method includes a network device sending a first indication information to a terminal device, wherein the first indication information is used to indicate at least one set of basis vector sets, and the at least one set of basis vector sets includes a frequency domain basis (FD basis) set or a spatial domain-frequency domain-basis (SD-FD-basis) set.

14 Claims, 3 Drawing Sheets

| Terminal Device | | Network Device |
|---|---|---|
| | S201, First indication information, wherein the first indication information is used to indicate at least one set of basis vector sets | |
| | S202, Second indication information, wherein the second indication information is used to indicate a basis vector selected by the terminal device from at least one set of basis vector sets indicated by the first indication information | |

(51) Int. Cl.
*H04W 72/044* (2023.01)
*H04W 72/0453* (2023.01)
*H04W 72/23* (2023.01)
*H04W 80/02* (2009.01)

(52) U.S. Cl.
CPC ......... *H04W 72/046* (2013.01); *H04W 72/23* (2023.01); *H04W 80/02* (2013.01)

(58) Field of Classification Search
CPC ... H04W 72/046; H04W 72/23; H04W 80/02; H04L 25/0202
See application file for complete search history.

(56) References Cited

U.S. PATENT DOCUMENTS

| 2020/0295813 | A1* | 9/2020 | Rahman | H04B 7/0626 |
| 2022/0303999 | A1* | 9/2022 | Chung | H04W 72/542 |
| 2022/0352949 | A1* | 11/2022 | Wu | H04B 7/0632 |
| 2023/0006725 | A1* | 1/2023 | Tosato | H04B 7/0626 |

FOREIGN PATENT DOCUMENTS

| CN | 106612134 A | 5/2017 |
| CN | 108880645 A | 11/2018 |
| CN | 110086732 A | 8/2019 |
| CN | 110557233 A | 12/2019 |
| CN | 110581724 A | 12/2019 |
| CN | 110754054 A | 2/2020 |
| CN | 110768700 A | 2/2020 |
| CN | 110830092 A | 2/2020 |
| CN | 110855336 A | 2/2020 |
| WO | 2016064246 A1 | 4/2016 |
| WO | 2020024289 A1 | 2/2020 |

OTHER PUBLICATIONS

International Search Report and the Written Opinion Dated Dec. 11, 2020 From the International Searching Authority Re. Application No. PCT/CN2020/078641.

International Search Report and the Written Opinion Dated Apr. 21, 2021 From the International Searching Authority Re. Application No. PCT/CN2021/075356.

Samsung, "Feature lead summary on offline email discussion for MU-MIMO CSI: FD basis subset selection", 3GPP TSG RAN WG1 97 R1-1906967, May 3, 2019. pp. 1 and 2.

The First Office Action dated May 6, 2024 from Chinese patent application No. 202211449866.1.

* cited by examiner

CODEBOOK FEEDBACK METHOD, NETWORK DEVICE, TERMINAL DEVICE, AND COMPUTER STORAGE MEDIUM

CROSS-REFERENCE TO RELATED APPLICATIONS

This application is a continuation of International Application No. PCT/CN2021/075356 filed on Feb. 4, 2021, entitled "CODEBOOK FEEDBACK METHOD, NETWORK DEVICE, TERMINAL DEVICE, AND COMPUTER STORAGE MEDIUM", which claims the benefit of priority to International Application No. PCT/CN2020/078641 filed on Mar. 10, 2020, entitled "CODEBOOK FEEDBACK METHOD, NETWORK DEVICE, TERMINAL DEVICE, AND COMPUTER STORAGE MEDIUM", both of which are incorporated herein by reference in their entireties.

TECHNICAL FIELD

The embodiments of the present application relate to the field of communication technologies, and more particularly, to a codebook feedback method, a network device, a terminal device, and a computer storage medium.

BACKGROUND

In a multiple input multiple output (MIMO) communication system, a receiver feeds back a channel state information (CSI) to a transmitter, and the transmitter performs operations such as precoding, beamforming, or antenna selection. The above-mentioned precoding mainly refers to that the transmitter modulates MIMO through a precoding matrix to transmit signals, so as to flexibly adjust the number of parallel streams according to MIMO channel conditions, and concentrate energy in a specific direction, which effectively overcomes an influence of an actual ill-conditioned channel on a system performance, improves a robustness of spatial multiplexing, and obtains the best MIMO transmission effect. The feedback method based on the codebook is to design a set of available precoding matrices according to statistical characteristics of the channel to form a codebook, and the codebook is known to both the receiver and the transmitter. In each channel realization, the receiver selects a codeword that best matches the channel from the codebook according to the estimated channel matrix and certain performance criteria, and then feeds back a serial number of the codeword to the transmitter. The transmitter finds out the corresponding codeword from the codebook according to the serial number of the codeword sent by the receiver. Then, the transmitter can use the found codeword to implement precoding. For each layer of codebooks, existing new radio (NR) type II codebooks are independently coded in the frequency domain. Due to a high-spatial quantization accuracy, the total feedback amount is large.

SUMMARY

Embodiments of the present disclosure provide a codebook feedback method, a network device, terminal device, and a computer storage medium, which can reduce an amount of codebook feedback and improve an efficiency of the codebook feedback.

In a first aspect, an embodiment of the present application provides a codebook feedback method, including:

sending, by a network device, a first indication information to a terminal device, wherein the first indication information is used to indicate at least one set of basis vector sets, and the at least one set of basis vector sets includes a frequency domain basis (FD basis) set or a spatial domain-frequency domain-basis (SD-FD-basis) set.

In a second aspect, an embodiment of the present application provides a codebook feedback method, including:

receiving, by a terminal device, a first indication information sent by a network device, wherein the first indication information is used to indicate at least one set of basis vector sets, and the at least one set of basis vector sets includes an FD basis set or an SD-FD-basis set.

In a third aspect, an embodiment of the present application provides a network device, wherein the network device has a function of implementing the above method. The function may be implemented by a hardware or may be implemented by the hardware executing a corresponding software. The hardware or the software includes one or more units corresponding to the above function.

In a fourth aspect, an embodiment of the present application provides a network device, including a processor and a memory, wherein the processor is coupled to the memory, wherein:

the memory is configured to store an instruction;
the processor is configured to send a first indication information to a terminal device, wherein the first indication information is used to indicate at least one set of basis vector sets, and the at least one set of basis vector sets includes an FD basis set or an SD-FD-basis set.

In a fifth aspect, an embodiment of the present application provides a computer storage medium, wherein the computer storage medium stores a computer program or an instruction, and when the computer program or the instruction is executed by a processor, the processor is enabled to perform the codebook feedback method according to the first aspect.

In a sixth aspect, an embodiment of the present application provides a computer program product, wherein the computer program product includes a non-transitory computer-readable storage medium storing a computer program, the computer program is operable to cause a computer to perform some or all of steps according to the first aspect of embodiments of the present application. The computer program product may be a software installation package.

In a seventh aspect, an embodiment of the present application provides a terminal device, where the terminal device has a function of implementing the above method. The function may be implemented by a hardware or may be implemented by the hardware executing a corresponding software. The hardware or the software includes one or more units corresponding to the above function.

In an eighth aspect, an embodiment of the present application provides a terminal device, including a processor and a memory, wherein the processor is coupled to the memory, wherein:

the memory is configured to store an instruction;
the processor is configured to send a first indication information to a terminal device, wherein the first indication information is used to indicate at least one set of basis vector sets, and the at least one set of basis vector sets includes an FD basis set or an SD-FD-basis set.

In a ninth aspect, an embodiment of the present application provides a computer storage medium, wherein the computer storage medium stores a computer program or an instruction, and when the computer program or the instruction is executed by a processor, the processor is enabled to perform the codebook feedback method according to the second aspect.

In a tenth aspect, the embodiments of the present application provide a computer program product, wherein the computer program product includes a non-transitory computer-readable storage medium storing a computer program, the computer program is operable to cause a computer to perform some or all of steps according to the first aspect of embodiments of the present application. The computer program product may be a software installation package.

It may be understood that in the embodiments of the present application, the network device indicates at least one set of basis vector sets to the terminal device through the first indication information, and the basis vector set includes the FD basis set or the SD-FD-basis set, which can reduce an amount of codebook feedback and improve an efficiency of the codebook feedback.

BRIEF DESCRIPTION OF THE DRAWINGS

The accompanying drawings required to be used in the description of the embodiments or the prior art will be briefly introduced below.

DETAILED DESCRIPTION

The technical solutions in the embodiments of the present application will be described below with reference to the accompanying drawings.

The technical solutions of the embodiments of the present application may be applied to various communication systems, for example: a long term evolution (LTE) system, an LTE frequency division duplex (FDD) system, an LTE time division duplex (TDD) system, an advanced long term evolution (LTE-A) system, a new radio (NR) system, an evolution system of an NR system, an LTE-based access to unlicensed spectrum (LTE-U) system, an NR-U system, an MIMO system, a wireless local area network (WLAN), a wireless fidelity (WiFi), a next-generation communication system, or other communication systems.

Generally speaking, a conventional communication system supports a limited quantity of connections and is easy to implement. However, with the development of a communications technology, in addition to conventional communication, a mobile communications system further supports, for example, device-to-device (D2D) communication, machine-to-machine (M2M) communication, machine type communication (MTC), and vehicle-to-vehicle (V2V) communication, etc. The embodiments of the present application can also be applied to these communications systems.

Figure 1:
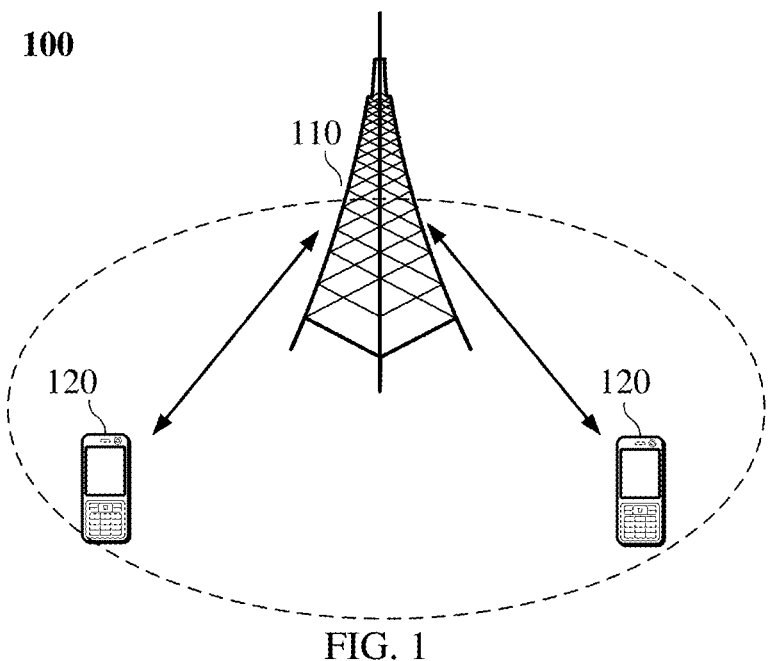
FIG. 1 is a system architecture diagram of a communication system provided by an embodiment of the present application.

For example, a communication system 100 to which the embodiments of the present application are applied is illustrated in FIG. 1. The communication system 100 may include a network device 110. The network device 110 may be a device communicating with a terminal 120 (or referred to as a communication terminal or a terminal). The network device 110 may provide a communication coverage for a particular geographical area and may communicate with a terminal located in the coverage area. Optionally, the network device 110 may be an evolved base station (evolutional Node B, eNB, or eNodeB) in the LTE system, or a wireless controller in a cloud radio access network (CRAN), or the network device may be a mobile switching center, a relay station, an access point, an in-vehicle device, a wearable device, a hub, a switch, a network bridge, a router, a network side device in a 5G network, a network device in a future evolved communication systems, etc.

The communication system 100 further includes at least one terminal device 120 located within the coverage of the network device 110. The terminal device 120 and the network device 110 may be connected by using a wireless interface or a wire interface. When the terminal device 120 is wirelessly connected to the network device 110, the terminal device may be referred to as a "wireless communication terminal", a "wireless terminal" or a "mobile terminal". Examples of the mobile terminal include but are not limited to a satellite or cellular telephone, a personal communications system (PCS) terminal that may combine a cellular radio telephone and capabilities of data processing, fax, and data communication, a PDA that may include a radio telephone, a pager, internet/intranet access, web browser, a logbook, a calendar, and/or a global positioning system (GPS) receiver, and a conventional laptop and/or palmtop receiver or another electronic apparatus including a radio telephone transceiver. The terminal may refer to an access terminal, user equipment (UE), a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, a terminal in a future evolved PLMN, etc.

Optionally, the 5G system or 5G network may also be referred to as a new radio (NR) system or an NR network.

FIG. 1 exemplarily illustrates a communication system 100, and the communication system 110 includes a network device 110 and two terminal devices 120. Optionally, the communication system 100 may include multiple network devices, and the coverage of each network device may include one or more terminal devices, which is not limited in this embodiment of the present application.

Optionally, the communication system 100 may further include other network entities such as a network controller and a mobility management entity. This is not limited in this embodiment of the present application.

It should be understood that terms "system" and "network" in this specification are usually interchangeably used in this specification. The term "and/or" in this specification is only an association relationship for describing the associated objects and may represent that three relationships may exist. For example, A and/or B may represent the following three cases: Only A exists, both A and B exist, and only B exists. In addition, the character "/" in this specification generally indicates an "or" relationship between the associated objects.

In a conventional communication system, for each layer of codebooks, existing NR type II codebooks are independently coded in the frequency domain. Due to a high-spatial quantization accuracy, the total feedback amount is too large.

In view of the above issues, the embodiments of the present application provide the following embodiments, which are described in detail below with reference to the accompanying drawings.

Figure 2:
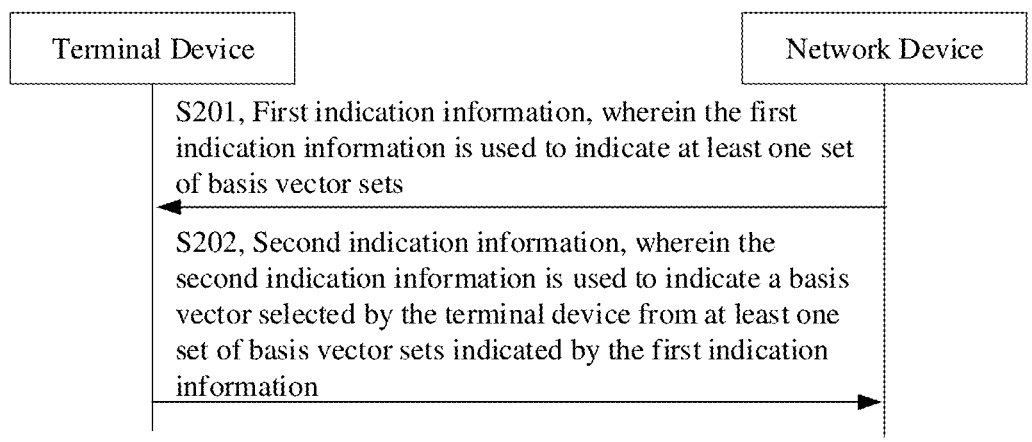
FIG. 2 is an example diagram of a codebook feedback method provided by an embodiment of the present application.

Refer to FIG. 2, FIG. 2 is a codebook feedback method provided by an embodiment of the present application, applied to the above-mentioned example communication system, and the method includes:

S201, the network device sends a first indication information to the terminal device, wherein the first indication information is used to indicate at least one set of basis vector sets, and the at least one set of basis vector sets includes a frequency domain basis (FD basis) set or a spatial domain-frequency domain-basis (SD-FD-basis) set. Exemplarily, the at least one set of basis vector sets indicated by the first indication information may be a candidate basis vector set.

The FD basis set includes at least one FD basis, the SD-FD-basis set includes at least one FD basis and at least one SD basis, and both the FD basis and the SD basis are discrete Fourier transform (DFT) vectors.

The first indication information may be a downlink control information (DCI) signaling, or the first indication information includes a radio resource control (RRC) parameter and/or a medium access allocation-control element (MAC-CE).

Further, if the first indication information is a DCI signaling, the DCI signaling is used to indicate at least one basis vector in the at least one set of basis vector sets.

Further, if the first indication information includes the MAC-CE, the MAC-CE is used to activate or deactivate at least one basis vector in the at least one set of basis vector sets.

In an implementation, the first indication information is used to indicate at least one FD basis among N3 FD basis, a number of the at least one FD basis is M', N3 is a positive integer, M' is a positive integer, and N3≥M'.

M' is reported by the terminal device or determined based on a higher-layer configuration.

In an implementation, the first indication information may be a bitmap with a length of N3, M' FD basis is determined by the bitmap with the length of N3, or the first indication information is a bitmap with a length of N3−1, M'−1 candidate FD basis in the M' FD basis is determined by the bitmap with the length of N3−1, or bits of the first indication information are the first length, and the first length is [nchoosek(N3−1, M'−1)].

In an implementation, the first indication information may be a bitmap with a length of N3/2, or the bits of the first indication information are a second length, and the second length is [nchoosek(N3/2, M/2)], where N3 FD basis comprises N3/2 sets of FD basis; or the first indication information may be a bitmap with a length of N3/2−1, or the bits of the first indication information are a third length, and the third length is $$\left[ nchoosek\left(\frac{N3}{2}-1, \frac{M}{2}-1\right)\right],$$

where N3 FD basis comprises (N3−1)/2+1 sets of FD basis.

The N3/2 sets of FD basis may be (x, N3−1−x), x=0, 1 . . . , N3/2−1, the (N3−1)/2+1 sets of FD basis are (0) and (x, N3−x), x=1, 2 . . . , N3/2−1, or the (N3−1)/2+1 sets of FD basis are ((N3−1)/2) and (x, N3−1−x), x=0, 1 . . . , (N3−1)/2−1.

Alternatively, the N3/2 sets of FD basis may be (x, N3/2+x), x=0, 1 . . . , N3/2−1, the (N3−1)/2+1 sets of FD basis are (0) and (x, N3−x), x=1, 2 . . . , N3/2−1, or the (N3-1)/2+1 sets of FD basis are ((N3−1)/2) and (x, N3−1−x), x=0, 1 . . . , (N3−1)/2−1.

In an implementation, the first indication information may include a first starting position, the first starting position is a position of the first FD basis included in the FD basis set in the N3 FD basis, and the FD basis included in the FD basis set is consecutive. The number of FD basis included in the FD basis set may be a higher-layer configuration or predefined.

In an implementation, the first indication information is used to determine a number of FD basis included in the FD basis set, the FD basis included in the FD basis set is consecutive, a first starting position is configured by a higher layer or pre-defined. For example, an index of the first starting position may be pre-defined through a higher-layer configuration, and the first starting position may be obtained based on the index of the first starting position. For another example, the first starting position may be directly configured by a high layer or pre-defined. The first starting position is a position of the first FD basis included in the FD basis set in the N3 FD basis.

In an implementation, a number of the FD basis included in the FD basis set and a first starting position are configured by a higher layer. For example, the index of the first starting position and the number of FD basis included in the FD basis set may be configured by a high layer, and the first starting position may be obtained based on the index of the first starting position. For another example, the first starting position and the number of FD basis included in the FD basis set may be directly configured by the high layer. The first starting position is a position of a first FD basis included in the FD basis set in the N3 FD basis.

$$S_x = i \times a, 0 \le i < \left\lceil \frac{N3}{a} \right\rceil,$$

$S_x$ represents the first starting position, i is an integer, a is an integer, a is determined according to a higher-layer configuration parameter, or a is a predefined parameter, for example a=2 or a=4.

Alternatively, $$S_x = i \times \frac{N3}{a}, 0 \le i < a, S_x$$

represents the first starting position, i is an integer, a is an integer, a is determined according to a higher-layer configuration parameter, or a is a predefined parameter, for example a=2 or a=4.

An FD basis sequence number is $f \in \{\mod(S_x+i, N_3), i=0, \ldots, L_x-1\}$, and $L_x$ represents a number of the FD basis included in the FD basis set.

Optionally, the starting position $S_x$ may be predefined, that is, the starting position $S_x$ is fixed.

If the FD basis set is a consecutive FD basis, it is represented as a window, wherein the number of consecutive FD basis in one segment is the length of the window, and $S_x$ is the starting position of the window. If the FD basis set includes multiple consecutive FD basis, it is represented as multiple windows, wherein a window represents a consecutive FD basis, and the number of consecutive FD basis in each segment is the length of each window.

For example, when it is represented as one window, $S_x$ may be equal to 0, or $S_x=-L_x/2$, or $S_x=-\Delta$. $\Delta$ is a predefined offset and may be $$\Delta = \frac{L_x}{2}.$$

For example, when it is represented as multiple windows, $$S_x = S_x = i \times \frac{N3}{a}, \text{ or } S_x = i \times \frac{N3}{a} - \Delta.$$

$\Delta$ is a predefined offset and may be $$\Delta = \frac{L_x}{2},$$

$0 \leq i < a$, i is an integer, a is an integer, a is determined according to a higher-layer configuration parameter, or a is a predefined parameter, for example, a is 2, 4 and so on.

Optionally, in the case of multiple windows, each window has the same length, that is, $L_1=L_2=\ldots=L$. That is to say, the number of FD basis included in the consecutive FD basis of each segment is the same.

In an implementation, the SD-FD-basis set includes at least one SD basis and at least one FD basis set, the first indication information includes a second starting position of each of FD basis sets, the second starting position of one of the FD basis sets is a position of a first FD basis in the FD basis set in N3 FD basis, and the FD basis included in each of the FD basis sets is consecutive.

Different SD basis corresponds to different FD basis sets, or multiple SD basis in the at least one SD basis corresponds to a same FD basis set.

In an implementation, the SD-FD-basis set includes at least one FD basis and at least one SD basis set, the first indication information includes a third starting position of each of SD basis sets, the third starting position of one of the SD basis sets is a position of a first SD basis in the SD basis set in N1N2 SD basis, and the SD basis included in each of the SD basis sets is consecutive.

Different FD basis corresponds to different SD basis sets, or multiple FD basis in the at least one FD basis corresponds to a same SD basis set.

In an implementation, the first indication information indicates a second starting position of the FD basis set and a third starting position of the SD basis set in the at least one set of SD-FD-basis sets, the FD basis and SD basis included in each set of the SD-FD-basis sets are consecutive, the second starting position of one of the FD basis sets is a position of a first FD basis in the FD basis set in N3 FD basis, and the third starting position of one of the SD basis sets is a position of a first SD basis in the SD basis set in N1N2 SD basis.

In an implementation, the first indication information is used to indicate the FD basis set corresponding to the SD basis in one polarization direction, and the FD basis set corresponding to the SD basis in another polarization direction is same as the FD basis set corresponding to the SD basis in the one polarization direction; and/or the first indication information is used to indicate the SD basis set corresponding to the FD basis in the one polarization direction, and the SD basis set corresponding to the FD basis in the another polarization direction is same as the SD basis set corresponding to the FD basis in the one polarization direction.

S202, the terminal device sends a second indication information to the network device, wherein the second indication information is used to indicate a basis vector selected by the terminal device from at least one set of basis vector sets indicated by the first indication information, and the basis vector includes an FD basis, or the FD basis and an SD basis.

Exemplarily, the step S202 in this embodiment of the present application may be an optional step. For example, the network device sends the first indication information to the terminal device, and the terminal device may determine at least one set of basis vector sets indicated by the network device according to the first indication information. The terminal device does not need to select at least one set of basis vector sets indicated by the network device, but directly acquires CSI based on the at least one set of basis vector set indicated by the network device and feeds back the CSI to the network device.

In an implementation, the second indication information may include an identifier of one or more sets of basis vector sets in the at least one set of basis vector sets.

In an implementation, bits of the second indication information are a fourth length, and the fourth length is $[\log_2 \text{nchoosek}(M'-1, M-1)]$; or the bits of the second indication information are a fifth length, and the fifth length is $[\log_2 \text{nchoosek}(M', M)]$, wherein the FD basis indicated by the second indication information is discrete.

In an implementation, the second indication information includes a fourth starting position, the fourth starting position is a position of a first FD basis selected by the terminal device in M FD basis selected by the terminal device, the FD basis selected by the terminal device is consecutive, and M is a number of the FD basis selected by the terminal device.

In an implementation, the second indication information may be a bitmap with a length of N3/2, or bits of the second indication information are a second length, and the second length is $[\text{nchoosek}(N3/2, M/2)]$, where N3 FD basis comprises N3/2 sets of FD basis; or the second indication information may be a bitmap with a length of N3/2−1, or the bits of the second indication information are a third length, and the third length is $$\left[ \text{nchoosek}\left(\frac{N3}{2} - 1, \frac{M}{2} - 1\right) \right],$$

where N3 FD basis comprises (N3−1)/2+1 sets of FD basis.

The N3/2 sets of FD basis are (x, N3−1−x), x=0, 1 ..., N3/2−1, the (N3−1)/2+1 sets of FD basis are (0) and (x, N3−x), x=1, 2 ..., N3/2−1, or the (N3−1)/2+1 sets of FD basis are ((N3−1)/2) and (x, N3−1−x), x=0, 1 ..., (N3−1)/2−1.

In an implementation, the FD basis indicated by the second indication information is selected from a union of one or more FD basis sets in at least one set of FD basis sets.

In an implementation, a number of the FD basis indicated by the second indication information is configured by the network device through a DCI signaling or determined through a high-layer configuration parameter.

In an implementation, an SD-FD-basis selected by the terminal device includes at least one SD basis and at least one FD basis set, the second indication information comprises a fourth starting position of each of the FD basis sets, the fourth starting position of one of the FD basis sets is a position of a first FD basis in the FD basis set in M FD basis sets, the FD basis included in each of the FD basis sets is consecutive, and M is a number of the FD basis selected by the terminal device.

In an implementation, different SD basis may correspond to different FD basis sets, or multiple SD basis in the at least one SD basis may correspond to a same FD basis set.

In an implementation, an SD-FD-basis selected by the terminal device includes at least one FD basis and at least one SD basis set, the second indication information includes a fifth starting position of each of the SD basis sets, the fifth starting position of one of the SD basis sets is a position of a first SD basis in the SD basis set in N1N2 SD basis, and the SD basis included in each of the SD basis sets is consecutive.

In an implementation, different FD basis may correspond to different SD basis sets, or multiple FD basis in the at least one FD basis may correspond to a same SD basis set.

In an implementation, the basis vector selected by the terminal device includes at least one set of SD-FD-basis sets, the second indication information indicates a fourth starting position of the FD basis set and a fifth starting position of the SD basis set in the at least one set of SD-FD-basis sets, the FD basis and the SD basis included in each set of the SD-FD-basis set are consecutive, the fourth starting position of one of the FD basis sets is a position of a first FD basis in the FD basis set in M FD basis sets, and the fifth starting position of one of the SD basis sets is a position of a first SD basis in the SD basis set in N1N2 SD basis.

In an implementation, the second indication information is used to indicate the FD basis set corresponding to the SD basis in one polarization direction, and the FD basis set corresponding to the SD basis in another polarization direction is same as the FD basis set corresponding to the SD basis in the one polarization direction; and/or the second indication information is used to indicate the SD basis set corresponding to the FD basis in the one polarization direction, and the SD basis set corresponding to the FD basis in the another polarization direction is same as the SD basis set corresponding to the FD basis in the one polarization direction.

In an implementation, if a bit configured by a higher layer is 1, the terminal device feeds back a non-zero coefficient on the FD basis with a bitmap of 1.

In an implementation, if a bit configured by a higher layer is greater than 1, a non-zero coefficient fed back by the terminal device on the FD basis is less than and/or equal to a threshold corresponding to a bit value of a preset parameter.

In an implementation, a maximum magnitude of the non-zero coefficients fed back by the terminal device on the FD basis is less than or equal to the threshold corresponding to the bit value of the preset parameter, or an average amplitude of the non-zero coefficients fed back by the terminal device on the FD basis is less than or equal to the threshold corresponding to the bit value.

In an implementation, the second indication information is used to indicate at least one SD-FD-basis set selected by the terminal device, an average amplitude of the non-zero coefficients fed back by the terminal device on an SD-FD-basis included in one of SD-FD-basis sets in the at least one SD-FD-basis set indicated by the second indication information is less than or equal to a threshold corresponding to the SD-FD-basis set.

In an implementation, if the threshold corresponding to the SD-FD-basis set is greater than zero, the terminal device feeds back the non-zero coefficient on the SD-FD-basis included in the SD-FD-basis set.

In an implementation, a number of quantization bits of non-zero coefficients fed back on the SD-FD-basis included in the SD-FD-basis set corresponding to different thresholds is different.

In an implementation, the second indication information is used to indicate at least one SD-FD-basis set selected by the terminal device, and a number of quantization bits of non-zero coefficients fed back by the terminal device on the SD-FD-basis included in the at least one SD-FD-basis set is different.

In an implementation, the second indication information is used to indicate at least one SD-FD-basis set selected by the terminal device, and a number of quantization bits of non-zero coefficients fed back by the terminal device on the SD-FD-basis included in one of SD-FD-basis sets is determined according to a priority of the non-zero coefficients.

In an implementation, the at least one set of SD-FD-basis sets includes C sets of SD-FD-basis sets, a number of non-zero coefficients fed back on the SD-FD-basis included in one of SD-FD-basis sets is $K_{nz,i} = \lceil a_i K_{nz} \rceil$, i=1 ... C−1, a number of non-zero coefficients fed back on the SD-FD-basis included in a last SD-FD-basis set in the at least one SD-FD-basis set is $$K_{nz,C} = K_{nz} - \Sigma_{i=1}^{C-1} \lceil a_i K_{nz} \rceil, a_i < 1.$$

In an implementation, a number of amplitude bits and/or a number of quantization bits of the non-zero coefficients fed back on the SD-FD-basis included in the at least one SD-FD-basis set is different.

In this embodiment of the present application, the network device indicates at least one set of basis vector sets to the terminal device through the first indication information, the basis vector set includes an FD basis set or an SD-FD-basis set, and then the terminal device selects a basis vector from the at least one set of basis vector sets indicated by the first indication information and reports it to the network device, which can reduce an amount of codebook feedback and improve an efficiency of the codebook feedback.

Based on the schematic flowchart of the codebook feedback method illustrated in FIG. 2, at least one set of basis vector sets indicated by the first indication information is used as a candidate basis vector set, the candidate basis vector set is an FD basis set as an example, and the codebook feedback method is specifically described in this embodiment of the present application.

The network device indicates the candidate FD-basis set to the terminal device, and the terminal device can select the FD-basis from the candidate FD-basis set to report.

In an implementation, the candidate FD-basis set may be indicated to the terminal device through a DCI signaling, or at least one set of FD-basis sets may be configured to the terminal device through a high layer configuration of an RRC parameter and/or an MAC-CE.

When there are multiple sets of configurations, the network device may indicate one of the sets through the DCI signaling or activate or deactivate one of the FD-basis sets through the MAC-CE.

When there are multiple sets of configurations, the terminal device may select at least one of the sets and report a sequence number of a candidate set selected by the terminal device to the network device.

In an implementation, for the FD-basis set with a length of N3, the network device may indicate M' to the terminal device. M' may be reported by the terminal device or determined by a parameter configured by a higher layer.

In an example, M' candidate FD-basis may be determined by a bitmap of length N3. Alternatively, M'−1 among them can be indicated by a bitmap of length N3−1, where FD-basis 0 is the FD-basis that is required by default. A non-zero bit indicates that the FD-basis is a candidate FD-basis.

In another example, the M' candidate FD-basis can also be indicated by means of a combination indicator, for example, a bit-width field indication of ceil(nchoosek(N3−1, M'−1)).

In an implementation, the terminal device may determine a candidate FD-basis set by indicating at least one FD-basis pair by the network device.

For example, when N3 is even, N3 FD-basis may be divided into N3/2 sets such as (0, N3−1), (1, N3−2) and so on, i.e., (x, N3−1−x), x=0,1 . . . N3/2−1, that is, x and N3−1−x form a set of FD-basis sets.

For another example, when N3 is odd, N3 FD-basis can be divided into (N3−1)/2+1 sets, such as (0), (1, N3−1), (2, N3−2), etc., i.e., (x, N3−x) x=1 . . . N3/2−1; or (0, N3−1), (1, N3−2), (x, N3−1−x), ((N3−1)/2). Optionally, because FD-basis0 may be required by default, when N3 is an odd number, N3−1 FD-basis except FD-basis0 among N3 FD-basis can be divided into (N3−1)/2 sets, for example (1, N3−1), (2, N3−2), etc., i.e., (x, N3−x) x=1 . . . N3/2−1; or (0, N3−1), (1, N3−2), (x, N3−1−x), ((N3−1)/2).

In this way, the network device can indicate the candidate FD-basis set through a bitmap of length N3/2 (or N3/2−1), or the network device may indicate the candidate FD-basis set by ceil(nchoosek(N3/2, M/2)) (or ceil(nchoosek(N3/2−1, M/2−1))).

TABLE 1

| FD-basis  | 0  | 1  | 2 | 3 | 4 | 5 |
|---|---|---|---|---|---|---|
| pair      | 11 | 10 | 9 | 8 | 7 | 6 |
| indicator | 1  | 1  | 0 | 0 | 0 | 0 |

In table 1, N3=12, 12 FD-basis can be divided into 6 sets, such as (0, 11), (1, 10), (2, 9), (3, 8), (4, 7), (5, 6), where the indication information of (0, 11) and (1, 10) is 1, and the indication information of other sets of FD basis sets are all 0, and it may be determined that the candidate FD basis set includes FD basis 0, FD basis 1, FD basis 10, and FD basis 11.

In an implementation, for an FD-basis set with a length of N3, the network device may indicate, to the terminal device, X (X≥1) FD-basis with a consecutive length of $L_x$ ($L_x \geq 0$), or predefined X (X≥1) FD-basis sets with a consecutive length of $L_x$ ($L_x \geq 0$). For example, the network device indicates ($S_x$, $L_x$) to determine a consecutive FD-basis, where $S_x$ is the starting position and $L_x$ is the length, that is, $\in \{\mod(S_x+i, N_3), i=0, \ldots, L_x-1\}$. $L_x$ may be a higher-layer configuration or predefined. Optionally, a certain segment in the X ($S_x$, $L_x$) contains FD-basis 0, for example, $S_x > \mod (S_x+L_x, N_3)$.

Optionally, the starting position satisfies certain constraints, such as $S_x = i \times a$, where i is an integer, for example, the value range is $$0 \le i < \left\lceil \frac{N3}{a} \right\rceil,$$

or a subset thereof. a can be an integer determined by a higher-layer configuration parameter or a predefined fixed parameter, such as $a = \lceil \alpha M \rceil$.

Optionally, the starting position $S_x$ may be predefined, that is, the starting position $S_x$ is fixed.

If the FD basis set is a consecutive FD basis, it is represented as a window, wherein the number of consecutive FD basis in one segment is the length of the window, and $S_x$ is the starting position of the window. If the FD basis set includes multiple consecutive FD basis, it is represented as multiple windows, wherein a window represents a consecutive FD basis, and the number of consecutive FD basis in each segment is the length of each window.

For example, when it is represented as one window, $S_x$ may be equal to 0, or $S_x = -L_x/2$, or $S_x = -\Delta$. $\Delta$ is a predefined offset and may be $$\Delta = \frac{L_x}{2}.$$

For example, when it is represented as multiple windows, $$S_x = S_x = i \times \frac{N3}{a}, \text{ or } S_X = i \times \frac{N3}{a} - \Delta.$$

$\Delta$ is a predefined offset and may be $$\Delta = \frac{L_x}{2},$$

0≤i<a, i is an integer, a is an integer, a is determined according to a higher-layer configuration parameter, or a is a predefined parameter, for example, a is 2, 4 and so on.

Optionally, in the case of multiple windows, each window has the same length, that is, $L_1 = L_2 = \ldots = L$. That is to say, the number of FD basis included in the consecutive FD basis of each segment is the same.

In an implementation, the terminal device may select M FD-basis from the candidate FD-basis set to report. When M is equal to the number of FD-basis contained in the candidate FD-basis set, the selection and/or reporting process does not exist.

The reporting methods of the terminal device may include the following three types:

1. The FD-basis selected by the terminal device from the candidate FD-basis set is discrete. The terminal device can report it through ceil(log2nchoosek(M'−1,M−1)) or ceil (log2(nchoosek(M',M)) bit.

2. The FD-basis selected by the terminal device from the candidate FD-basis set is consecutive, and the terminal device may report the starting position of the selected FD-basis.

3. The FD-basis selected by the terminal device from the candidate FD-basis set is based on the FD-basis-pair, and M' FD-basis may be divided into M'/2 sets, for example (0, M'−1), (1, M'−2), (x, M'−1−x) x=0,1 ... M'/2−1.

In an implementation, when multiple sets of candidate FD-basis sets are selected, the terminal device may report the number of the candidate set it has selected and select the FD-basis from the union of the sets, and then the terminal device may report through any one of the above three reporting methods.

Optionally, if the terminal device selects multiple sets of candidate FD-basis sets, the terminal device may also report the number of the selected sets.

Based on the schematic flowchart of the codebook feedback method illustrated in FIG. 2, at least one set of basis vector sets indicated by the first indication information is used as a candidate basis vector set, the candidate basis vector set is an SD-FD basis set as an example, and the codebook feedback method is specifically described in this embodiment of the present application.

The network device indicates the candidate SD-FD-basis set to the terminal device, and the terminal device may select the SD-FD-basis from the candidate SD-FD-basis set to report. Exemplarily, the SD-FD-basis may be a bitmap in the Rel16 codebook, and the value of the bitmap is 1, indicating that the terminal device has selected the corresponding SD-basis and FD-basis.

In an implementation, the candidate SD-FD-basis set may be indicated to the terminal device through a DCI signaling, or at least one set of SD-FD-basis sets may be configured to the terminal device through a high layer configuration of an RRC parameter and/or an MAC-CE.

When there are multiple sets of configurations, the network device may indicate one of the sets through the DCI signaling or activate or deactivate one of the SD-FD-basis sets through the MAC-CE.

When there are multiple sets of configurations, the terminal device may select at least one of the sets and report a sequence number of a candidate set selected by the terminal device to the network device.

In an implementation, the manner in which the network device indicates the SD-FD-basis set (or the terminal device reports the SD-FD-basis set) may include the following four types:

1. The terminal device determines a set corresponding to at least one SD-basis, and the FD-basis set is f∈ {mod($f_x$+i, N), i=0,1 ... $d_x$−1}., in the scenario where the network device indicates the candidate SD-FD-basis set, N can be represented as N3, and in the scenario that the terminal device reports the SD-FD-basis set, N can represent M.

In an example, each SD-basis has an FD-basis configuration; fx and/or dx may be predefined or determined by a higher-layer configuration. Different SD-basis may correspond to the same fx and/or dx.

In an example, 2L (2L>1) SD-basis correspond to an identical FD-basis configuration, e.g., f∈ {mod($f_x$+i, N), i=0,1 ... $d_x$−1}, $f_1$=$f_2$= ... =$f_{2L}$, $d_1$=$d_2$= ... =$d_{2L}$.

2. The terminal device determines the set corresponding to at least one FD-basis, and its SD-basis set is s∈ {mod($s_y$+i, P−1), i=0,1 ... $d_y$}, where P can be N1*N2.

In an example, each FD-basis has an SD-basis configuration, and sy and/or dy may be predefined or determined by a higher-layer configuration. Different FDs may correspond to the same sy and/or dy.

In an example, all FD-basis may correspond to the same SD-basis configuration, i.e., s∈ {mod($s_y$+i,P), i=0,1 ... $d_y$−1}, $s_1$=$s_2$= ... =$s_M$, $d_1$=$d_2$= ... =$d_M$.

Figure 3:
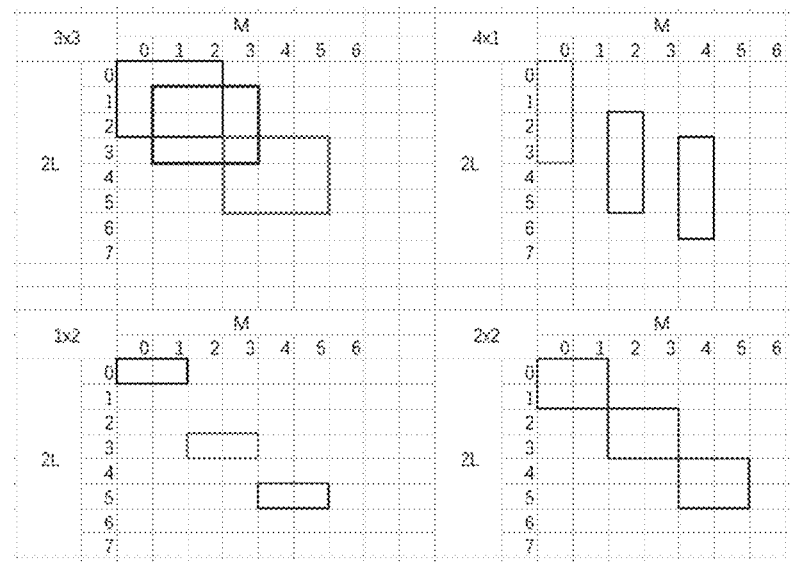
FIG. 3 is an example diagram of a bitmap provided by an embodiment of the present application.

3. The terminal device may indicate a consecutive SD-FD-basis set, its range is {(s,f) |f∈ {mod ($f_t$+i, N), i=0, ... , $d_x$−1}, s∈ {mod ($s_t$+j, P), j=0, ... , $d_y$−1}. Taking FIG. 3 as an example, the upper left is a 3×3 SD-FD-basis set, and the lower right is a 2×2 SD-FD-basis set.

In an example, when there are multiple blocks, the different blocks may overlap. For example, FD-basis overlaps, but SD-basis does not. Another example is that SD-basis overlaps, but FD-basis does not. Another example is FD-basis overlaps, SD-basis overlaps.

In an example, when there are multiple blocks, the different blocks cannot overlap.

4. In the above-mentioned methods 1, 2, and 3, two polarization directions may correspond to the same set. Taking method 1 as an example, f∈ {mod($f_x$+i, N), i=0, 1 ... $d_x$−1}, the sets corresponding to SD-basis x and SD-basis mod(x+L,P) are the same, for example $f_x$=$f_{mod(x+L,2L)}$. Taking method 2 as an example, s∈ {mod ($s_y$+i, P), i=0,1 ... $d_y$−1}and includes mod(s+L,P). Taking method 3 as an example, SD-basis x is the same set corresponding to SD-basis mod(x+L,P), and/or FD-basis is the same set corresponding to SD-basis mod(s+L,P).

In an implementation, the terminal device may select K SD-FD-basis coefficients from the candidate SD-FD-basis set to report.

In an example, when there are multiple blocks, the terminal device may select at least one report from the multiple configured blocks. The number of blocks reported by the terminal device may be determined by a higher-layer parameter or selected by the terminal device (the number of blocks reported at the same time). Optionally, the terminal device may indicate non-zero elements in the block through the combination indicator or bitmap. For example, when different blocks do not overlap, it can be indicated by a bitmap with a length of $Qd_xd_y$, where Q represents the number of blocks.

In an example, the terminal device may add 0 to the Rel-16 amplitude quantization table, and based on this, the terminal device may not report the bitmap. The amplitude quantization table after adding 0 can be illustrated in table 2.

TABLE 2

| Rel 16 | | New scheme | |
|---|---|---|---|
| $k^{(2)}_{l,i,f}$ | $p^{(2)}_{l,i,f}$ | $k^{(2)}_{l,i,f}$ | $p^{(2)}_{l,i,f}$ |
| 0 | $\frac{1}{8\sqrt{2}}$ | 0 | 0 |
| 1 | $\frac{1}{8}$ | 1 | $\frac{1}{8}$ |
| 2 | $\frac{1}{4\sqrt{2}}$ | 2 | $\frac{1}{4\sqrt{2}}$ |
| 3 | $\frac{1}{4}$ | 3 | $\frac{1}{4}$ |

TABLE 2-continued

| | Rel 16 | | New scheme |
| --- | --- | --- | --- |
| $k^{(2)}_{l,i,f}$ | $P^{(2)}_{l,i,f}$ | $k^{(2)}_{l,i,f}$ | $P^{(2)}_{l,i,f}$ |
| 4 | $\frac{1}{2\sqrt{2}}$ | 4 | $\frac{1}{2\sqrt{2}}$ |
| 5 | $\frac{1}{2}$ | 5 | $\frac{1}{2}$ |
| 6 | $\frac{1}{\sqrt{2}}$ | 6 | $\frac{1}{\sqrt{2}}$ |
| 7 | 1 | 7 | 1 |

The embodiment of the present application determines the channel state information through frequency domain or frequency domain and space domain codebook restriction, and the specific scheme is described as follows:

In an implementation, the amplitudes on the N3 FD-basis components may be determined by a higher-layer configuration.

The magnitude constraint on each FD-basis component is determined by x bits (x>=1). When x=1, the terminal device can report non-zero coefficients in the FD-basis corresponding to its bitmap of 1. If the bitmap is 0, the corresponding FD-basis cannot report non-zero coefficients. When x>1, the amplitude of the terminal device in the FD-basis cannot exceed the corresponding threshold.

TABLE 3

| Bit | Threshold |
| --- | --- |
| 00 | 0 |
| 01 | $\sqrt{1/4}$ |
| 10 | $\sqrt{1/2}$ |
| 11 | 1 |

Taking table 3 as an example, assuming that the amplitude constraint on the FD-basis component is determined by 2 bits, and the bit value is 00, then the amplitude of the FD-basis component can be confirmed to be 0. Assuming that the amplitude constraint on the FD-basis component is determined by 2 bits, and the bit value is 01, it is certain that the amplitude of the FD-basis cannot exceed $\sqrt{(1/4)}$.

Optionally, the threshold can correspond to the maximum magnitude of the maximum coefficient of each FD-basis, for example $$\max_{i,p} p^{(1)}_{l,p} p^{(2)}_{l,i+pL,f} \leq \gamma_f.$$

Optionally, the threshold can correspond to the maximum magnitude of the average magnitude of non-zero coefficients in each FD-basis, for example $$\sqrt{\frac{1}{\sum_{k=0}^{2L-1} k^{(3)}_{l,i,f}} \sum_{k=0}^{2L-1} k^{(3)}_{l,s,f} \left(p^{(1)}_{l,p} p^{(2)}_{l,i,f}\right)^2} \leq \gamma_f.$$

Or use the same threshold for both polarization directions, e.g., $\sqrt{\frac{1}{\sum_{k=0}^{L-1} k^{(3)}_{l,i+pL,f}} \sum_{k=0}^{L-1} k^{(3)}_{l,i+pL,f} \left(p^{(1)}_{l,p} p^{(2)}_{l,i+pL,f}\right)^2} \leq \gamma_f.$ q=0/1 means two polarization directions.

In an implementation manner, when the threshold corresponding to a certain FD-basis among the M FD-basis selected by the terminal device is 0, the terminal device may not report the corresponding part in its bitmap.

In an implementation, the terminal device may determine the magnitude on the SD-FD-basis component through a higher-layer configuration.

In an example, the network device indicates an amplitude threshold of at least one SD-FD-basis. In details, for the ith block SD-FD-basis set, its amplitude constraint is $\gamma_i$, and the range of the ith block is $S_i=\{(s, f) | f \in \{\mod (f_i+i, N)\}, i=0, \ldots, d_x-1\}, s \in \{\mod(s_i+j, P), j=0, \ldots, d_y-1\}\}$, then the constraints are $$\sqrt{\frac{1}{\sum_{(s,f) \in S_i} k^{(3)}_{l,s,f}} \sum_{(s,f) \in S_i} k^{(3)}_{l,s,f} \left(p^{(1)}_{l,p} p^{(2)}_{l,s,f}\right)^2} \leq \gamma_i.$$

In an example, when the threshold corresponding to the SD-FD-basis set selected by the terminal device is 0, the terminal device does not report the corresponding part in its bitmap.

In an example, corresponding to different thresholds, the amplitude/phase of the corresponding coefficients may be quantized with different bits, as illustrated in table 4, for example.

TABLE 4

| Bit | Threshold | Amplitude [bit] | Phase [bit] |
| --- | --- | --- | --- |
| 00 | 0 | 0 | 0 |
| 01 | $\sqrt{1/4}$ | 1 | 2 |
| 10 | $\sqrt{1/2}$ | 2 | 3 |
| 11 | 1 | 3 | 4 |

In the embodiment of the present application, the terminal device uses different bits to quantize the determined amplitude or phase according to the position of the coefficient SD-FD-basis and reports a non-zero coefficient (NZC).

Figure 4:
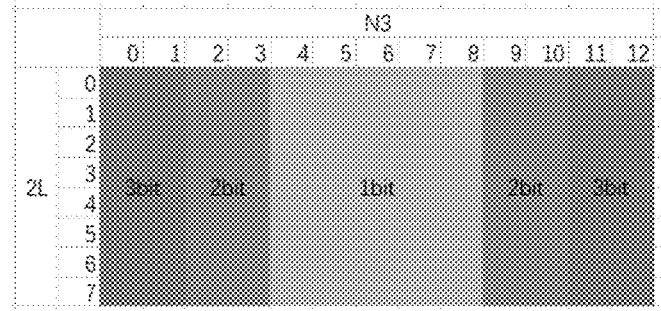
FIG. 4 is an example diagram of an amplitude quantization provided by an embodiment of the present application.

In an example, for different SD-FD-basis blocks, the magnitude uses 3 bits or 2 bits or 1 bit to quantize the range of the ith block, $S_i=\{(s, f) | f \in \{\mod (f_i+i, N_3)\}, i=0, \ldots, d_x-1\}$, $s \in \{j=0, \ldots, 2L-1\}$, as illustrated in FIG. 4. Similar to amplitude quantization, phase is quantized by 4 bits, 3 bits, or 2 bits in the corresponding range.

Optionally, in uplink control information (UCI) part 1, the terminal device reports the number of non-zero coefficients in each range, and when the rank v>1, reports the sum of the coefficients of all layers belonging to the same range.

In an implementation, the terminal device may determine the number of quantization bits for the amplitude and/or phase of each part of the non-zero coefficients according to the priority of the non-zero coefficients.

In an example, the priority takes Pri(l, i, f)=2·L·v·π(f)+v·i+l, with $$\pi(f) = \min(2 \cdot n^{(f)}_{3,l}, 2 \cdot (N_3 - n^{(f)}_{3,l}) - 1)$$

with l=1,2, . . . , v, =0,1, . . . ,2L−1, and f=0,1, . . . , $M_v$−1.

In an example, the number of quantization bits of non-zero coefficients is divided into C parts, and the number of non-zero coefficients in each part is $K_{nz,i}=\lceil a_i K_{nz} \rceil$, i=1 . . . C−1, the last $$K_{nz,C} = K_{nz} - \Sigma_{i=1}^{C-1} \lceil a_i K_{nz} \rceil;$$

($K_{nz,1}=\lceil a_1 K_{nz} \rceil - v$ does not contain the strongest coefficient), $a_i < 1$ is a higher-layer configuration or predetermined. For example, when divided into two parts, $K_{nz,1}=\lceil \frac{1}{2} K_{nz} \rceil - v$, $K_{nz,1}=\lfloor \frac{1}{2} K_{nz} \rfloor$, the first part uses 3 bits for amplitude and/or 4bits for phase, and the second part uses 2 bits for amplitude and/or 2 bits for phase.

In an example, the amplitude quantization corresponding to different bit numbers is illustrated in table 5. Similar to the amplitude, the phase is (16PSK→4bit, 8PSK→3bit, QPSK→2bit, BPSK→1bit).

TABLE 5

| | 3 bit | 2 bit | 1 bit |
|---|---|---|---|
| $k^{(2)}_{l,i,f}$ | $P^{(2)}_{l,i,f}$ | $P^{(2)}_{l,i,f}$ | $P^{(2)}_{l,i,f}$ |
| 0 | $\frac{1}{8\sqrt{2}}$ | $\frac{1}{2\sqrt{2}}$ | $\frac{1}{\sqrt{2}}$ |
| 1 | $\frac{1}{8}$ | $\frac{1}{2}$ | 1 |
| 2 | $\frac{1}{4\sqrt{2}}$ | $\frac{1}{\sqrt{2}}$ | |
| 3 | $\frac{1}{4}$ | 1 | |
| 4 | $\frac{1}{2\sqrt{2}}$ | | |
| 5 | $\frac{1}{2}$ | | |
| 6 | $\frac{1}{\sqrt{2}}$ | | |
| 7 | 1 | | |

The parameters involved in the above embodiments will be described below.

N3 is the length of the basis vector, N3=Nsb*R, Nsb represents the number of subbands reported by CSI, Nsb is configured by a higher layer, R is 1 or 2, and R is configured by the higher layer.

L represents the number of SD-basis selected by the terminal device (2L corresponds to two polarization directions), and L is configured by the higher layer.

β is used to configure the maximum number of non-zero coefficients, and β is configured by the higher layer.

p is used to configure the number of FD-basis selected by the terminal device, and p is configured by the higher layer.

M represents the number of FD-basis selected by the terminal device, M=ceil(p*N3/R).

K0 represents the maximum number of non-zero coefficients, $K0=\lceil \beta*2LM \rceil$.

The embodiment of the present application provides another codebook feedback method, which is applied to the above-mentioned example communication system, and the method includes: sending, by the terminal device, a second indication information to the network device, wherein the second indication information is used to indicate a basis vector selected by the terminal device from at least one set of basis vector sets indicated by the first indication information, and the basis vector includes an FD basis, or the FD basis and an SD basis.

At least one set of basis vector sets is predefined. In an implementation, the number of FD basis included in the FD basis set and the first starting position are predefined. For example, the index of the first starting position and the number of FD basis included in the FD basis set may be predefined, and the first starting position may be obtained based on the index of the first starting position. For another example, the first starting position and the number of FD basis included in the FD basis set can be directly predefined. The first starting position is the position of the first FD basis included in the FD basis set in the N3 FD basis.

For the terminal device to send the second indication information to the network device and the specific content of the second indication information, reference may be made to the description of step S202 in the foregoing embodiment, which is not repeated in this embodiment of the present application.

In this embodiment of the present application, the terminal device indicates to the network device the basis vector selected by the terminal device from at least one predefined set of basis vector sets to the network device through the second indication information, which can reduce an amount of codebook feedback and improve an efficiency of the codebook feedback.

The embodiment of the present application provides another codebook feedback method, which is applied to the above example communication system. The method includes at least one set of basis vector sets and the basis vector selected by the terminal device from the above at least one set of basis vector sets are predefined. That is to say, because at least one set of basis vector sets is predefined, the terminal device can know the specific content of the at least one set of basis vector sets without the need for the network device to indicate at least one set of basis vector sets to the terminal device through the first indication information. Similarly, because the basis vector selected by the terminal device from the above at least one set of basis vector sets are predefined, there is no need for the terminal device to indicate to the network device through the second indication information that the terminal device selects from the predefined at least one set of basis vector sets. With the selected basis vector, the network device can know the basis vector selected by the terminal device, which can reduce an amount of codebook feedback and improve an efficiency of the codebook feedback.

The foregoing solutions in the implementations of the present application is mainly described from the viewpoint of interaction process of various network elements. It can be understood that, in order to implement the above functions, the terminal device includes hardware structures and/or software modules corresponding to the respective functions. Those skilled in the art can readily recognize that, in combination with exemplary units and scheme steps described in the implementations disclosed herein, the present application can be implemented in hardware or a combination of the hardware and computer software. Whether a function is implemented by way of the hardware or computer-software driving hardware depends on particular applications and design constraints of the technical solution. Those skilled in the art may use different methods to implement described functions for each particular application, but such implementation may not be considered as beyond the scope of the present application.

According to the implementations of the present application, the terminal device may include various functional units in accordance with the foregoing method implementations. For example, each function corresponds to a functional unit, and two or more functions may be integrated in one processing unit. The above-mentioned integrated unit can be implemented in the form of hardware or software functional modules. It can be noted that the division of units in the implementations of the present application is illustrative, and is merely a logical function division, and there may be other division manners in actual implementation.

Figure 5:
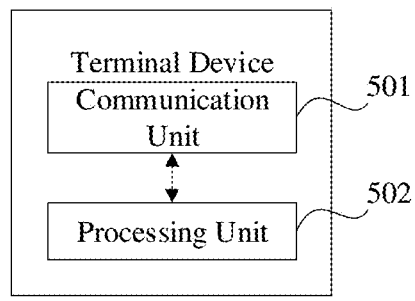
FIG. 5 is a schematic structural diagram of a terminal device provided by an embodiment of the present application.

In case of the integrated unit, FIG. 5 illustrates a possible functional unit block diagram of the terminal device involved in the above-mentioned embodiment, and the terminal device includes:

a communication unit 501 configured to receive a first indication information sent by a network device, wherein the first indication information is used to indicate at least one set of basis vector sets, and the basis vector set include FD basis sets or SD-FD-basis sets.

A processing unit 502 may be a processor or a controller, and the communication unit 501 may be a transceiver, a transceiver circuit, a radio frequency chip, etc.

In an implementation, the communication unit 501 is further configured to send a second indication information to the network device, wherein the second indication information is used to indicate a basis vector selected by the processing unit 502 from at least one set of basis vector sets indicated by the first indication information, and the basis vector includes an FD basis, or the FD basis and an SD basis.

In an implementation, the second indication information may include an identifier of one or more sets of basis vector sets in the at least one set of basis vector sets.

In an implementation, bits of the second indication information are a fourth length, and the fourth length is $\lceil \log_2 \text{nchoosek}(M'-1, M-1) \rceil$; or the bits of the second indication information are a fifth length, and the fifth length is $\lceil \log_2 \text{nchoosek}(M', M) \rceil$ wherein the FD basis indicated by the second indication information is discrete.

In an implementation, the second indication information includes a fourth starting position, the fourth starting position is a position of a first FD basis selected by the processing unit 502 in M FD basis selected by the processing unit 502, the FD basis selected by the terminal device is consecutive, and M is a number of the FD basis selected by the processing unit 502.

In an implementation, the second indication information may be a bitmap with a length of N3/2, or bits of the second indication information are a second length, and the second length is $\lceil \text{nchoosek}(N3/2, M/2) \rceil$ where N3 FD basis comprises N3/2 sets of FD basis; or the second indication information may be a bitmap with a length of N3/2−1, or the bits of the second indication information are a third length, and the third length is $$\left\lceil \text{nchoosek}\left(\frac{N3}{2} - 1, \frac{M}{2} - 1\right) \right\rceil,$$

where N3 FD basis comprises (N3−1)/2+1 sets of FD basis.

The N3/2 sets of FD basis are (x, N3−1−x), x=0, 1 ..., N3/2−1, the (N3−1)/2+1 sets of FD basis are (0) and (x, N3−x), x=1, 2 ..., N3/2−1, or the (N3−1)/2+1 sets of FD basis are ((N3−1)/2) and (x, N3−1−x), x=0, 1 ..., (N3−1)/2−1.

In an implementation, the FD basis indicated by the second indication information is selected from a union of one or more FD basis sets in at least one set of FD basis sets.

In an implementation, a number of the FD basis indicated by the second indication information is configured by the network device through a DCI signaling or determined through a high-layer configuration parameter.

In an implementation, an SD-FD-basis selected by the terminal device includes at least one SD basis and at least one FD basis set, the second indication information comprises a fourth starting position of each of the FD basis sets, the fourth starting position of one of the FD basis sets is a position of a first FD basis in the FD basis set in M FD basis sets, the FD basis included in each of the FD basis sets is consecutive, and M is a number of the FD basis selected by the processing unit 502.

In an implementation, different SD basis may correspond to different FD basis sets, or multiple SD basis in the at least one SD basis may correspond to a same FD basis set.

In an implementation, an SD-FD-basis selected by the processing unit 502 includes at least one FD basis and at least one SD basis set, the second indication information includes a fifth starting position of each of the SD basis sets, the fifth starting position of one of the SD basis sets is a position of a first SD basis in the SD basis set in N1N2 SD basis, and the SD basis included in each of the SD basis sets is consecutive.

In an implementation, different FD basis may correspond to different SD basis sets, or multiple FD basis in the at least one FD basis may correspond to a same SD basis set.

In an implementation, the basis vector selected by the processing unit 502 includes at least one set of SD-FD-basis sets, the second indication information indicates a fourth starting position of the FD basis set and a fifth starting position of the SD basis set in the at least one set of SD-FD-basis sets, the FD basis and the SD basis included in each set of the SD-FD-basis set are consecutive, the fourth starting position of one of the FD basis sets is a position of a first FD basis in the FD basis set in M FD basis sets, and the fifth starting position of one of the SD basis sets is a position of a first SD basis in the SD basis set in N1N2 SD basis.

In an implementation, the second indication information is used to indicate the FD basis set corresponding to the SD basis in one polarization direction, and the FD basis set corresponding to the SD basis in another polarization direction is same as the FD basis set corresponding to the SD basis in the one polarization direction; and/or the second indication information is used to indicate the SD basis set corresponding to the FD basis in the one polarization direction, and the SD basis set corresponding to the FD basis in the another polarization direction is same as the SD basis set corresponding to the FD basis in the one polarization direction.

In an implementation, if a bit configured by a higher layer is 1, the processing unit 502 feeds back a non-zero coefficient on the FD basis with a bitmap of 1.

In an implementation, if a bit configured by a higher layer is greater than 1, a non-zero coefficient fed back by the processing unit 502 on the FD basis is less than and/or equal to a threshold corresponding to a bit value of a preset parameter.

In an implementation, a maximum magnitude of the non-zero coefficients fed back by the processing unit 502 on the FD basis is less than or equal to the threshold corresponding to the bit value of the preset parameter, or an average amplitude of the non-zero coefficients fed back by the processing unit 502 on the FD basis is less than or equal to the threshold corresponding to the bit value.

In an implementation, the second indication information is used to indicate at least one SD-FD-basis set selected by the processing unit 502, an average amplitude of the non-zero coefficients fed back by the terminal device on an SD-FD-basis included in one of SD-FD-basis sets in the at least one SD-FD-basis set indicated by the second indication information is less than or equal to a threshold corresponding to the SD-FD-basis set.

In an implementation, if the threshold corresponding to the SD-FD-basis set is greater than zero, the terminal device feeds back the non-zero coefficient on the SD-FD-basis included in the SD-FD-basis set.

In an implementation, a number of quantization bits of non-zero coefficients fed back on the SD-FD-basis included in the SD-FD-basis set corresponding to different thresholds is different.

In an implementation, the second indication information is used to indicate at least one SD-FD-basis set selected by the processing unit 502, and a number of quantization bits of non-zero coefficients fed back by the processing unit 502 on the SD-FD-basis included in the at least one SD-FD-basis set is different.

In an implementation, the second indication information is used to indicate at least one SD-FD-basis set selected by the processing unit 502, and a number of quantization bits of non-zero coefficients fed back by the processing unit 502 on the SD-FD-basis included in one of SD-FD-basis sets is determined according to a priority of the non-zero coefficients.

In an implementation, the at least one set of SD-FD-basis sets includes C sets of SD-FD-basis sets, a number of non-zero coefficients fed back on the SD-FD-basis included in one of SD-FD-basis sets is $K_{nz,i} = \lceil a_i K_{nz} \rceil$, i=1 ... C−1, a number of non-zero coefficients fed back on the SD-FD-basis included in a last SD-FD-basis set in the at least one SD-FD-basis set is $$K_{nz,C} = K_{nz} - \Sigma_{i=1}^{C-1} \lceil a_i K_{nz} \rceil, \ a_i < 1.$$

In an implementation, a number of amplitude bits and/or a number of quantization bits of the non-zero coefficients fed back on the SD-FD-basis included in the at least one SD-FD-basis set is different.

In this embodiment of the present application, the communication unit 501 indicates at least one set of basis vector sets to the terminal device through the first indication information, the basis vector set includes an FD basis set or an SD-FD-basis set, and then the terminal device selects a basis vector from the at least one set of basis vector sets indicated by the first indication information and reports it to the network device, which can reduce an amount of codebook feedback and improve an efficiency of the codebook feedback.

Figure 6:
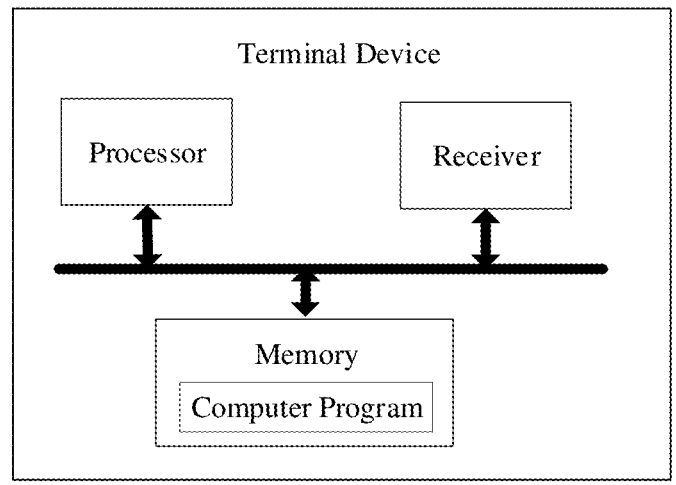
FIG. 6 is a schematic structural diagram of another terminal device provided by an embodiment of the present application.

When the processing unit 502 is a processor and the communication unit 501 is a transceiver, the terminal device involved in this embodiment of the present application may be the terminal device illustrated in FIG. 6.

Embodiments of the present application further provide a computer-readable storage medium, wherein the computer-readable storage medium stores a computer program for electronic data exchange. The computer program causes a computer to execute some or all of the steps described by the terminal device in the above method embodiments.

Embodiments of the present application further provide a computer program product, wherein the computer program product includes a non-transitory computer-readable storage medium storing a computer program. The computer program is operable to cause a computer to execute some or all of the steps described by the terminal device in the above method embodiments. The computer program product may be a software installation package.

Figure 7:
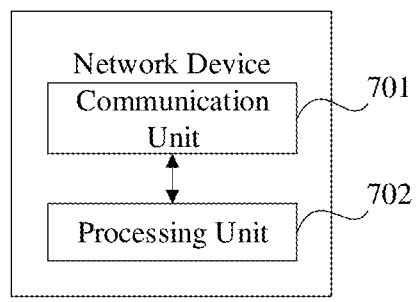
FIG. 7 is a schematic structural diagram of a network device provided by an embodiment of the present application.

In the case of the integrated unit, FIG. 7 illustrates a block diagram of a possible functional unit composition of the network device involved in the above-mentioned embodiment, and the network device includes:

a communication 701 configured to send a first indication information to a terminal device, wherein the first indication information is used to indicate at least one set of basis vector sets, and the at least one set of basis vector sets includes a frequency domain basis (FD basis) set or a spatial domain-frequency domain-basis (SD-FD-basis) set. Exemplarily, the at least one set of basis vector sets indicated by the first indication information may be a candidate basis vector set.

A processing unit 702 may be a processor or a controller, and the communication unit 701 may be a transceiver, a transceiver circuit, a radio frequency chip, etc.

In an implementation, the communication unit 701 is further configured to receive a second indication information sent by the terminal device, wherein the second indication information is used to indicate a basis vector selected by the terminal device from at least one set of basis vector sets indicated by the first indication information, and the basis vector includes an FD basis, or the FD basis and an SD basis.

In an implementation, the first indication information may be a DCI signaling, or the first indication information includes an RRC parameter and/or an MAC-CE.

In an implementation, the first indication information is a DCI signaling, and the DCI signaling is used to indicate at least one basis vector in the at least one set of basis vector sets.

In an implementation, the first indication information includes the MAC-CE, and the MAC-CE is used to activate or deactivate at least one basis vector in the at least one set of basis vector sets.

In an implementation, the first indication information is used to indicate at least one FD basis among N3 FD basis, a number of the at least one FD basis is M', N3 is a positive integer, M' is a positive integer, and N3≥M'.

M' is reported by the terminal device or determined based on a higher-layer configuration.

In an implementation, the first indication information may be a bitmap with a length of N3, M' FD basis is determined by the bitmap with the length of N3, or the first indication information is a bitmap with a length of N3−1, M'−1 candidate FD basis in the M' FD basis is determined by the bitmap with the length of N3−1, or bits of the first indication information are the first length, and the first length is [nchoosek(N3−1, M'−1)].

In an implementation, the first indication information may be a bitmap with a length of N3/2, or the bits of the first indication information are a second length, and the second length is [nchoosek(N3/2, M/2)], where N3 FD basis comprises N3/2 sets of FD basis; or the first indication information may be a bitmap with a length of N3/2−1, or the bits of the first indication information are a third length, and the third length is $$\left[nchoosek\left(\frac{N3}{2}-1, \frac{M}{2}-1\right)\right],$$

where N3 FD basis comprises (N3−1)/2+1 sets of FD basis.

The N3/2 sets of FD basis may be (x, N3−1−x), x=0, 1 . . . , N3/2−1, the (N3−1)/2+1 sets of FD basis are (0) and (x, N3−x), x=1, 2 . . . , N3/2−1, or the (N3−1)/2+1 sets of FD basis are ((N3−1)/2) and (x, N3−1−x), x=0, 1 . . . , (N3−1)/2−1.

Alternatively, the N3/2 sets of FD basis may be (x, N3/2+x), x=0, 1 . . . , N3/2−1, the (N3−1)/2+1 sets of FD basis are (0) and (x, N3−x), x=1, 2 . . . , N3/2−1, or the (N3−1)/2+1 sets of FD basis are ((N3−1)/2) and (x, N3−1−x), x=0, 1 . . . , (N3−1)/2−1.

In an implementation, the first indication information may include a first starting position, the first starting position is a position of the first FD basis included in the FD basis set in the N3 FD basis, and the FD basis included in the FD basis set is consecutive.

In an implementation, the first indication information is used to determine a number of FD basis included in the FD basis set, the FD basis included in the FD basis set is consecutive, a first starting position is configured by a higher layer or pre-defined. The first starting position is a position of the first FD basis included in the FD basis set in the N3 FD basis.

In an implementation, a number of the FD basis included in the FD basis set and a first starting position are configured by a higher layer. The first starting position is a position of a first FD basis included in the FD basis set in the N3 FD basis.

In an implementation, $S_x = i \times a$, $$0 \leq i < \left\lceil \frac{N3}{a} \right\rceil, S_x$$

represents the first starting position, i is an integer, a is an integer, a is determined according to a higher-layer configuration parameter, or a is a predefined parameter.

Alternatively, $$S_x = i \times \frac{N3}{a},$$

$0 \leq i < a$, $S_x$ represents the first starting position, i is an integer, a is an integer, a is determined according to a higher-layer configuration parameter, or a is a predefined parameter, for example a=2 or a=4.

An FD basis sequence number is $f \in \{\mathrm{mod}(S_x+i, N_3), i=0, \ldots, L_x-1\}$, and $L_x$ represents a number of the FD basis included in the FD basis set.

Optionally, the starting position $S_x$ may be predefined, that is, the starting position $S_x$ is fixed.

If the FD basis set is a consecutive FD basis, $S_x=0$, or $S_x=-L_x/2$, or $S_x=-\Delta$. $\Delta$ is a predefined offset.

If the FD basis set includes multiple consecutive FD basis, $$S_x = S_x = i \times \frac{N3}{a}, \text{ or } S_X = i \times \frac{N3}{a} - \Delta.$$

$\Delta$ is a predefined offset and may be $$\Delta = \frac{L_x}{2},$$

$0 \leq i < a$, i is an integer, a is an integer, a is determined according to a higher-layer configuration parameter, or a is a predefined parameter.

Optionally, if the FD basis set includes multiple consecutive FD basis, the number of FD basis included in the consecutive FD basis of each segment is the same.

In an implementation, the FD basis set includes at least one FD basis, the SD-FD-basis set includes at least one FD basis and at least one SD basis, and both the FD basis and the SD basis are discrete Fourier transform (DFT) vectors.

In an implementation, the SD-FD-basis set includes at least one SD basis and at least one FD basis set, the first indication information includes a second starting position of each of FD basis sets, the second starting position of one of the FD basis sets is a position of a first FD basis in the FD basis set in N3 FD basis, and the FD basis included in each of the FD basis sets is consecutive.

In an implementation, different SD basis corresponds to different FD basis sets, or multiple SD basis in the at least one SD basis corresponds to a same FD basis set.

In an implementation, the SD-FD-basis set includes at least one FD basis and at least one SD basis set, the first indication information includes a third starting position of each of SD basis sets, the third starting position of one of the SD basis sets is a position of a first SD basis in the SD basis set in N1N2 SD basis, and the SD basis included in each of the SD basis sets is consecutive.

In an implementation, different FD basis corresponds to different SD basis sets, or multiple FD basis in the at least one FD basis corresponds to a same SD basis set.

In an implementation, the first indication information indicates a second starting position of the FD basis set and a third starting position of the SD basis set in the at least one set of SD-FD-basis sets, the FD basis and SD basis included in each set of the SD-FD-basis sets are consecutive, the second starting position of one of the FD basis sets is a position of a first FD basis in the FD basis set in N3 FD basis, and the third starting position of one of the SD basis sets is a position of a first SD basis in the SD basis set in N1N2 SD basis.

In an implementation, the first indication information is used to indicate the FD basis set corresponding to the SD basis in one polarization direction, and the FD basis set corresponding to the SD basis in another polarization direction is same as the FD basis set corresponding to the SD basis in the one polarization direction; and/or the first indication information is used to indicate the SD basis set corresponding to the FD basis in the one polarization direction, and the SD basis set corresponding to the FD basis in the another polarization direction is same as the SD basis set corresponding to the FD basis in the one polarization direction.

In this embodiment of the present application, the communication unit 701 sends the first indication information to the terminal device, wherein the first indication information is used to indicate at least one set of basis vector sets, and the basis vector set includes an FD basis set or an SD-FD-basis set, which can reduce an amount of codebook feedback and improve an efficiency of the codebook feedback.

Figure 8:
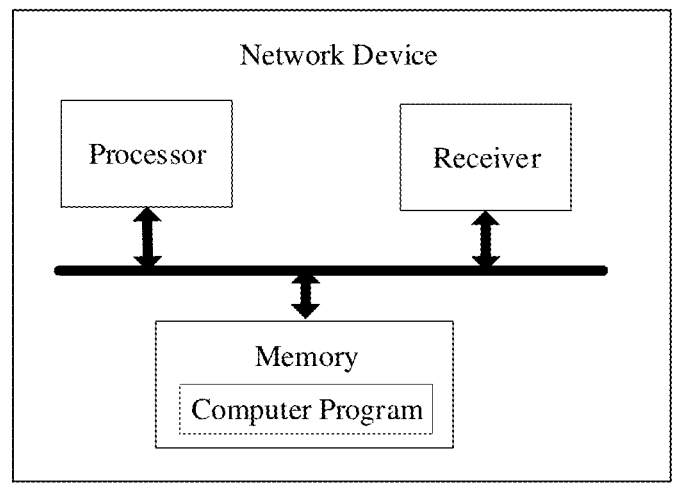
FIG. 8 is a schematic structural diagram of another network device provided by an embodiment of the present application.

When the processing unit 702 is a processor and the communication unit 701 is a transceiver, the network device involved in this embodiment of the present application may be the network device illustrated in FIG. 8.

Embodiments of the present application further provide a computer-readable storage medium, wherein the computer-readable storage medium stores a computer program for electronic data exchange. The computer program causes a computer to execute some or all of the steps described by the network device in the above method embodiments.

Embodiments of the present application further provide a computer program product, wherein the computer program product includes a non-transitory computer-readable storage medium storing a computer program. The computer program is operable to cause a computer to execute some or all of the steps described by the network device in the above method embodiments. The computer program product may be a software installation package.

The algorithmic operations and the method described in the implementations of the present application may be implemented via hardware, or may be implemented via a manner of executing software instructions by a processor. The software instructions may be composed with corresponding software modules. The software modules can be stored in a storage medium such as a random access memory (RAM), a flash memory, a read only memory (ROM), an erasable programmable read-only memory (EPROM), an electrically erasable programmable read-only memory (EEPROM), a register, a hard disc, a mobile hard disc, or a compact disc read-only memory (CD-ROM), or in any other types of storage media known in this field. An exemplary storage medium is coupled to the processor, so that the processor can read information from the storage medium and can write information to the storage medium. Of course, the storage medium can also be a part of the processor. The processor and the storage medium may be located in an ASIC. In addition, the ASIC may be located in an access network device, a target network device, or a core network device. Of course, the processor and the storage medium may also be presented as discrete components in the access network device, the target network device, or the core network device.

Those skilled in the art can appreciate that, in the above-mentioned one or more implementations, all or part of the described functions can be implemented via software, hardware, firmware, or any other combination thereof. When implemented via software, all or part of the above functions can be implemented in the form of a computer program product. The computer program product includes one or more computer instructions. When the computer instructions are loaded and executed on a computer, all or part of the operations or functions in the implementations of the present application are performed. The computer can be a general-purpose computer, a special-purpose computer, a computer network, or other programmable apparatuses. The computer instructions can be stored in a computer-readable storage medium or transmitted from one computer-readable storage medium to another computer-readable storage medium. For example, the computer instructions can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server integrated with one or more usable media, a data center, or the like. The usable medium can be a magnetic medium (such as a soft disc, a hard disc, or a magnetic tape), an optical medium (such as a digital video disc (DVD)), or a semiconductor medium (such as a solid state disk (SSD)), etc.

The above-mentioned implementations provide further details of the purpose, technical solutions, and beneficial effects of the implementations of the present application. It can be understood that the above is only an implementation of the present application and is not intended to limit the scope of protection of the present application. Any modification, equivalent replacement and improvement made within the spirit and principles of the present application shall be included in the scope of protection of the present application.

What is claimed is:

1. A codebook feedback method, comprising:
sending, by a network device, first indication information to a terminal device, wherein the first indication information is used to indicate at least one set of basis vector sets, and the at least one set of basis vector sets comprises a frequency domain basis (FD basis) set or a spatial domain-frequency domain-basis (SD-FD-basis) set; and
receiving, by the network device, second indication information sent by the terminal device, wherein the second indication information is used to indicate a basis vector selected by the terminal device from at least one set of basis vector sets indicated by the first indication information, and the basis vector comprises an FD basis, or the FD basis and an SD basis;
wherein the first indication information is used to indicate at least one FD basis among N3 FD basis, a number of the at least one FD basis is M', N3 is a positive integer, M' is a positive integer, and N3≥M';
wherein bits of the second indication information are a fourth length, and the fourth length is [$\log_2$ nchoosek (M'−1, M−1)], M being a number of FD basis selected by the terminal device.

2. The method according to claim 1, wherein the first indication information is downlink control information (DCI) signaling, or the first indication information comprises a radio resource control (RRC) parameter and/or a medium access allocation-control element (MAC-CE).

3. The method according to claim 2, wherein the first indication information is the DCI signaling, and the DCI signaling is used to indicate at least one basis vector in the at least one set of basis vector sets.

4. The method according to claim 2, wherein the first indication information comprises the MAC-CE, and the MAC-CE is used to activate or deactivate at least one basis vector in the at least one set of basis vector sets.

5. The method according to claim 1, wherein the first indication information is used to determine a number of FD basis included in the FD basis set, the FD basis included in the FD basis set is consecutive, a first starting position is configured by a higher layer or pre-defined, and the first starting position is a position of the first FD basis included in the FD basis set in N3 FD basis.

6. The method according to claim 1, wherein the first indication information comprises a first starting position, $S_x$ is predefined, and $S_x$ represents the first starting position;
in a case that the FD basis set comprises a consecutive FD basis, $S_x=0$, or $S_x=-L_x/2$, or $S_x=-\Delta$, where $L_x$ represents a number of the FD basis included in the FD basis set, and $\Delta$ is a predefined offset;

in a case that the FD basis set comprises multiple consecutive FD basis, $$S_x = S_x = i \times \frac{N3}{a}, \text{ or } S_X = i \times \frac{N3}{a} - \Delta,$$

where $\Delta$ is a predefined offset, $0 \leq i < a$, i is an integer, a is an integer, a is determined according to a higher-layer configuration parameter, or a is a predefined parameter.

7. A codebook feedback method, comprising:
receiving, by a terminal device, first indication information sent by a network device, wherein the first indication information is used to indicate at least one set of basis vector sets, and the at least one set of basis vector sets comprises an FD basis set or an SD-FD-basis set; and
sending, by the terminal device, second indication information to the network device, wherein the second indication information is used to indicate a basis vector selected by the terminal device from at least one set of basis vector sets indicated by the first indication information, and the basis vector comprises an FD basis, or the FD basis and an SD basis;
wherein the first indication information is used to indicate at least one FD basis among N3 FD basis, a number of the at least one FD basis is M', N3 is a positive integer, M' is a positive integer, and N3≥M';
wherein bits of the second indication information are a fourth length, and the fourth length is [log$_2$ nchoosek (M'−1, M−1)], M being a number of FD basis selected by the terminal device.

8. The method according to claim 7, wherein the second indication information comprises an identifier of one or more sets of basis vector sets in the at least one set of basis vector sets.

9. A network device, comprising a processor and a memory, wherein the processor is coupled to the memory, wherein
the memory is configured to store an instruction; and
the processor is configured to send first indication information to a terminal device, wherein the first indication information is used to indicate at least one set of basis vector sets, and the at least one set of basis vector sets comprises an FD basis set or an SD-FD-basis set; and
the processor is further configured to receive second indication information sent by the terminal device, wherein the second indication information is used to indicate a basis vector selected by the terminal device from at least one set of basis vector sets indicated by the first indication information, and the basis vector comprises an FD basis, or the FD basis and an SD basis;
wherein the first indication information is used to indicate at least one FD basis among N3 FD basis, a number of the at least one FD basis is M', N3 is a positive integer, M' is a positive integer, and N3≥M';
wherein bits of the second indication information are a fourth length, and the fourth length is [log$_2$ nchoosek (M'−1, M−1)], M being a number of FD basis selected by the terminal device.

10. The network device according to claim 9, wherein the first indication information is downlink control information (DCI) signaling, or the first indication information comprises a radio resource control (RRC) parameter and/or a medium access allocation-control element (MAC-CE).

11. The network device according to claim 10, wherein the first indication information is the DCI signaling, and the DCI signaling is used to indicate at least one basis vector in the at least one set of basis vector sets.

12. The network device according to claim 10, wherein the first indication information comprises the MAC-CE, and the MAC-CE is used to activate or deactivate at least one basis vector in the at least one set of basis vector sets.

13. The network device according to claim 9, wherein the first indication information is used to determine a number of FD basis included in the FD basis set, the FD basis included in the FD basis set is consecutive, a first starting position is configured by a higher layer or pre-defined, and the first starting position is a position of the first FD basis included in the FD basis set in N3 FD basis.

14. The network device according to claim 9, wherein the first indication information comprises a first starting position, $S_x$ is predefined, and $S_x$ represents the first starting position;
in a case that the FD basis set comprises a consecutive FD basis, $S_x=0$, or $S_x=-L_x/2$, or $S_x=-\Delta$, where $L_x$ represents a number of the FD basis included in the FD basis set, and $\Delta$ is a predefined offset;
in a case that the FD basis set comprises multiple consecutive FD basis, $$S_x = S_x = i \times \frac{N3}{a}, \text{ or } S_X = i \times \frac{N3}{a} - \Delta,$$

where $\Delta$ is a predefined offset, $0 \leq i < a$, i is an integer, a is an integer, a is determined according to a higher-layer configuration parameter, or a is a predefined parameter.

* * * * *